H. W. LUNDQUIST.
CURRENT OR WAVE MOTOR.
APPLICATION FILED MAR. 6, 1911.
1,016,022.
Patented Jan. 30, 1912.
2 SHEETS—SHEET 1.
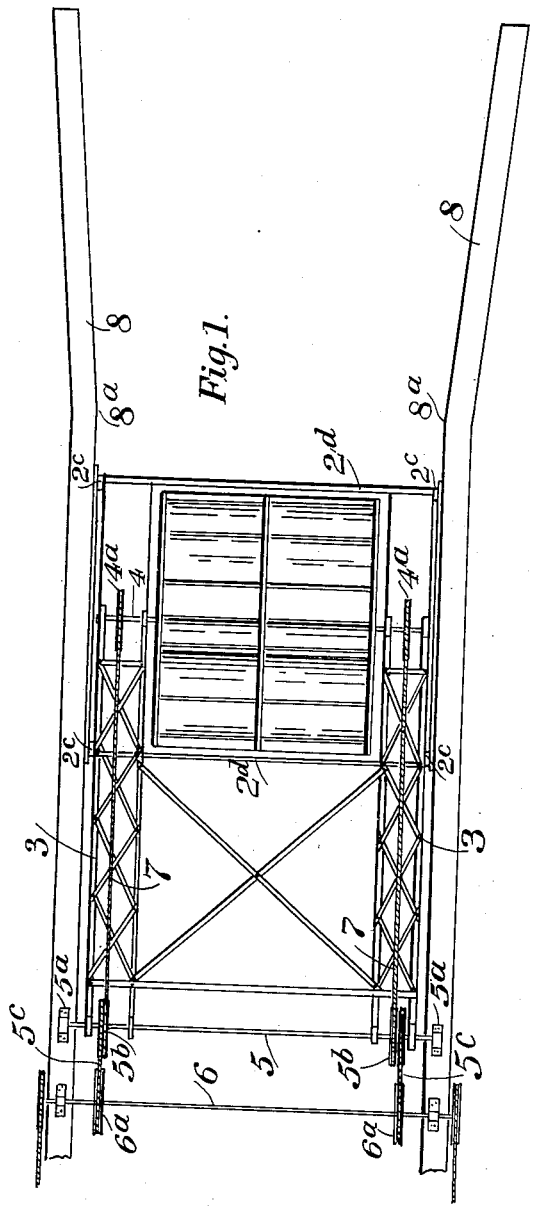
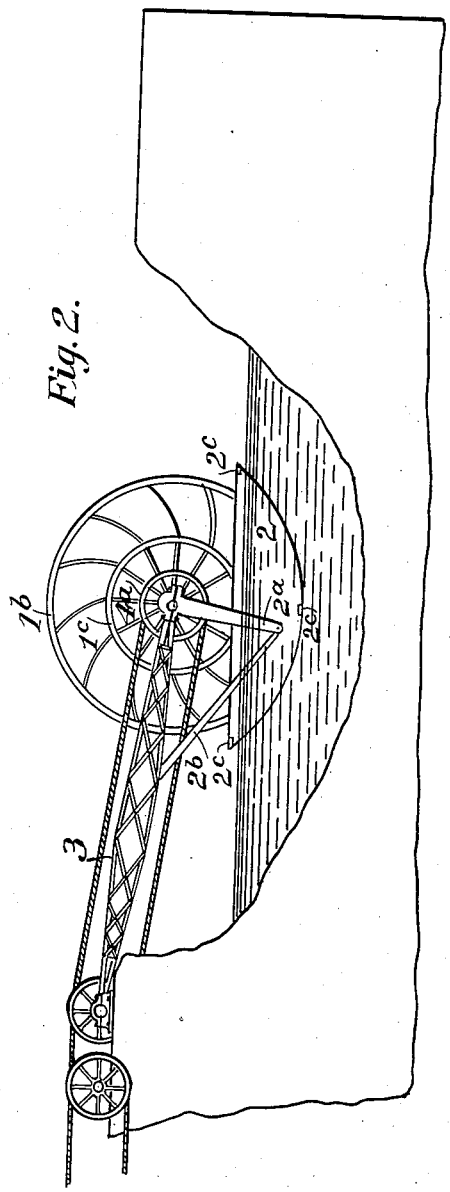
WITNESSES:
Elmer E. Rodabaugh
Mary C. Bowman.
INVENTOR.
Hendrick W. Lundquist.
BY
A. B. Bowman
ATTORNEY.

H. W. LUNDQUIST.
CURRENT OR WAVE MOTOR.
APPLICATION FILED MAR. 6, 1911.

1,016,022.

Patented Jan. 30, 1912.

2 SHEETS—SHEET 2.

WITNESSES:
Elmer E. Rodabaugh,
Mary A. Bowman.

INVENTOR.
Hendrick W. Lundquist.
BY
A. B. Bowman
ATTORNEY.

UNITED STATES PATENT OFFICE.

HENDRICK W. LUNDQUIST, OF SAN DIEGO, CALIFORNIA.

CURRENT OR WAVE MOTOR.

1,016,022.      Specification of Letters Patent.      Patented Jan. 30, 1912.

Application filed March 6, 1911. Serial No. 612,658.

*To all whom it may concern:*

Be it known that I, HENDRICK W. LUNDQUIST, a citizen of the United States, and a resident of San Diego, in the county of San Diego and State of California, have invented certain new and useful Improvements in Current or Wave Motors, of which the following is a specification.

My invention relates to motors to be used in streams of water where there is a current or in the breakers near the shores of bodies of water, and the objects are to provide a mechanism that is of simple and economical construction, easily installed, and which is adapted to utilize a large portion of the power produced by currents of water or breakers, further to provide such mechanism with a means to cause it to rise and fall with the rise and fall of the surface of the water.

With these and other objects in view as will appear hereinafter, my invention consists of certain novel features of construction, combination and arrangement of parts as will be described in detail and particularly set forth in the appended claims, reference being had to the accompanying drawings and to the characters of reference thereon, which form a part of this specification, in which:—

Figure 3:
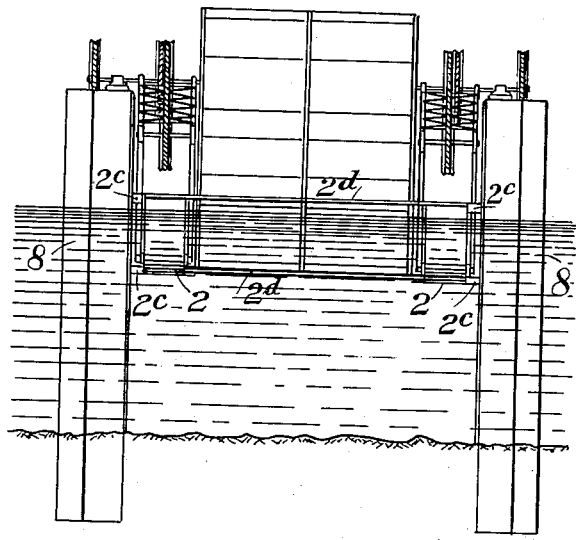
Figure 4:
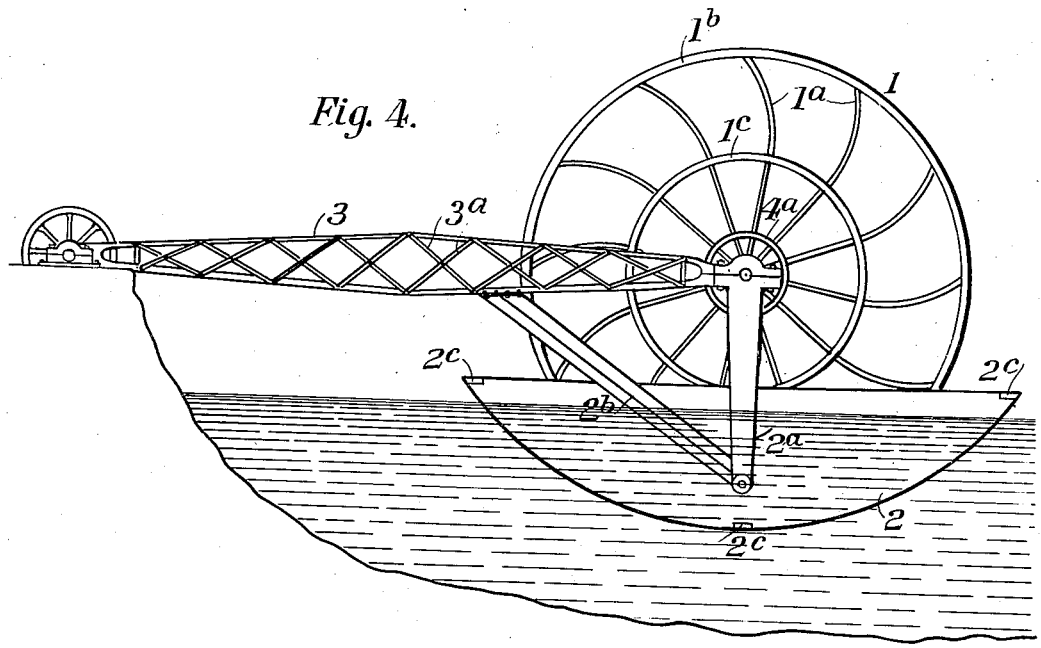

Figure 1. is a plan view of one unit of my mechanism complete, Fig. 2. is a side elevational view thereof, showing parts broken away, Fig. 3 is an end elevational view thereof and Fig. 4 is a side elevational view on an enlarged scale showing a portion in detail.

Similar characters of reference refer to similar parts throughout the several views:—

The wheel 1, floats 2, arms 3, axle 4, shaft 5, shaft 6, cables 7, and piers 8 constitute the principal parts of my invention.

The piers 8 are preferably of concrete, but may be of any material. These piers 8 are spaced apart a suitable distance and extend longitudinally with the current of water, if in a stream, and at right angles to the normal trend of the breakers if in a body of water. They diverge beginning at points $8^a$ toward the ends directed against the current or breakers. Just back of said diverging points, between the piers 8 is placed wheel 1 which is provided with a plurality of curved blades $1^a$, as shown best in Fig. 4, which extend across the wheel. These blades are connected in their relative positions by means of rings $1^b$ and $1^c$, which substantially brace the same. This wheel 1 is rigidly mounted upon axle 4. Said axle 4 is revolubly mounted in the extended ends of arms 3. These arms 3 are each composed of four longitudinal members which converge outwardly at each end from their centers and these members are braced by means of braces $3^a$ on their sides. Extending down from the outward extended ends of said arms are supports $2^a$ which extend down to near the periphery of the wheel 1. From the lower ends of said supports connecting with the arms 3, are braces $2^b$ adapted to make the supports $2^a$ more rigid. These supports are for the purpose of keeping the arms 3 in a nearly horizontal position and allow the use of a large water wheel, thus increasing the power to be obtained therefrom. Upon the lower extended ends of supports $2^a$ and braces $2^b$, which are rigidly connected together at their lower ends, are pivotally mounted floats 2 which are of a sufficient size to sustain this extended portion including the wheel, at a suitable relative position to the surface of the water. These floats 2 are curved on their lower surfaces, so as to allow the free passage of water under them and are pivoted on said supports at a low point to decrease their tilting tendency, and they are connected together by means of cross pieces $2^d$. On the outer surfaces of the floats are provided spacing blocks $2^c$ which are adapted to hold the floats in their proper relative positions to the piers 8 and prevent their contacting with said piers when rising or falling with the water. The other ends of arms 3 are rigidly mounted upon a shaft 5 which is pivotally mounted upon the top surface of the piers 8 in boxes $5^a$. Upon the axle 4 on each side of the wheel, and between the two side members of each arm 3 are rigidly mounted cable sheaves $4^a$ and upon shaft 5 are revolubly mounted double grooved sheaves $5^b$, upon which are mounted endless cables 7. In one of the grooves in sheaves $5^b$ are mounted cables $5^c$ which connect with sheaves $6^a$ which are rigidly mounted upon a revolubly mounted shaft 6 to which may be connected any mechanism it is desired to drive. The construction as shown is only one unit, of which there may be a plurality, set end to end, between said piers and connected together by means of the cables as shown, and by using a plurality of the sets of piers placed side by side.

It will be readily seen that with the construction as shown and described, there is provided a mechanism so constructed that the movement of the water between said piers will revolve the wheel 1, which will revolve sheaves 4ᵃ and 5ᵇ which in turn being connected with shaft 6 will cause it to revolve. This shaft 6 may be connected to any mechanism desired to be driven, preferably an air compressor, by the use of which power may be uniformly utilized; that the floats 2 will hold the wheel in a suitable relative position to the surface of the water at all times, regardless of the rise and fall thereof; that the piers diverging as shown and described provide an increased facility for utilizing the power from the current or waves.

Having thus described my invention, what I claim as new and desire to secure by Letters Patent, is:—

1. A current or wave motor comprising longitudinally disposed piers spaced apart and diverging toward the current, a shaft pivotally mounted on said piers and extending from one to the other, thrust arms rigidly mounted on said pivotally mounted shaft, a water wheel revolubly mounted on the extended end of said thrust arms between the same, supports in connection with said thrust arms extending downwardly, connected floats provided with curved lower surfaces pivotally mounted near their lower surfaces to supports and connected together, sheaves in connection with said water wheel, sheaves mounted on said pivotally mounted shaft, cables connecting the sheaves on said water wheel with the ones on said pivotally mounted shaft, another revoluble shaft mounted on said piers connected to the sheaves on said pivotally mounted shaft by means of cables, and means on said floats for holding said floats in position, all substantially as set forth.

2. A current or wave motor comprising longitudinally disposed piers side by side and spaced apart, diverging toward their extended ends, a shaft mounted on said piers, double extended thrust arms rigidly mounted on said shaft, near said piers, a water wheel provided with curved blades, revolubly mounted on the extended ends of said thrust arms, a float provided with a curved lower surface, located adjacent to each of said piers, on each side of said water wheel, extension supports pivotally mounted near the lower surface of said floats and connecting with the extended ends of said thrust arms adapted to support the central portion of the wheel some distance above the floats, sheaves mounted on said water wheel, sheaves mounted on said shaft, cables connecting the same, another shaft mounted on said pier, sheaves mounted on said shaft, cables connecting with those on the other, and another cable adapted to connect with any driven mechanism, all substantially as set forth.

3. A current or wave motor comprising, two separate longitudinally disposed piers placed side by side and spaced apart, a shaft pivotally mounted on said piers, a revoluble shaft mounted on said piers, adjacent thereto, double thrust arms braced together rigidly mounted on said pivotally mounted shaft, and extending toward the current of the water, adjacent and parallel to said piers, a water wheel provided with curved blades, and a plurality of annular braces revolubly mounted on the extended ends of said arms, sheaves mounted on said water wheel, floats at each side of said wheel connected together by beams, supports pivotally mounted on said floats, near their lower surfaces, connecting with said extended arms adapted to support the wheel the required distance above said float, double groove sheaves revolubly mounted on said pivotally mounted shaft, cables connecting the sheaves on said water wheel with said double sheaves, sheaves mounted on said revoluble shafts, cables connecting said sheaves on said revoluble shaft with said double sheaves, all substantially as set forth.

4. A current or wave motor, comprising two separate diverging piers, spaced apart side by side, and longitudinally disposed to the direction of the flow of the water, a pivotally mounted shaft connecting one pier with the other, a revoluble shaft mounted on said piers, adjacent thereto, two double thrust arms between said piers, rigidly mounted on said pivotally mounted shaft at one of their ends and extending toward the current of water, a water wheel provided with curved blades, and braced with a plurality of annular braces, revolubly mounted on and between the extended ends of said arms, a support on each of the extended ends of said arms extending downwardly some distance to the braces connecting the extended end of said supports with said arms, floats connected by beams pivotally mounted near their lower surface on the lower extended end of said supports, and said braces, sheaves mounted on said water wheel, double grooved sheaves mounted on said pivotally mounted shaft, a cable connecting the sheaves on said water wheel with the sheaves on said pivotally mounted shaft, cable and sheave means adapted to connect said double sheaves with any driven mechanism, and means between said piers and said floats for holding said wheel centrally between said piers, all substantially as set forth.

5. A current or wave motor comprising two separate piers with portions diverging and spaced apart side by side in line with the flow of the water, a pivotally mounted shaft mounted on said piers, a pair of thrust arms spaced apart and rigidly mounted on said shaft and projecting toward the current or flow, downwardly extending supports mounted on the extended ends of said arms and substantially braced, floats provided with curved lower surfaces in connection with and pivotally mounted on said supports adapted to sustain a wheel, a water wheel horizontally mounted between the extended ends of said pair of arms, double sheaves on said pivotally mounted shaft, sheaves on each side of said wheel, endless cables connecting the sheaves on said wheel with those on said shaft, another shaft revolubly mounted on said piers, and sheaves on said shaft connecting with the double sheaves on said pivotally mounted shaft, and means on said floats for holding said floats in position, all substantially as set forth.

In testimony whereof, I have hereunto subscribed my name in the presence of two subscribing witnesses.

HENDRICK W. LUNDQUIST.

Witnesses:
ABRAM B. BOWMAN,
MARY A. BOWMAN.